C. G. SEGER.
HAY SWEEP CLEANER.
APPLICATION FILED DEC. 29, 1915.
1,219,495.
Patented Mar. 20, 1917.
2 SHEETS—SHEET 2.
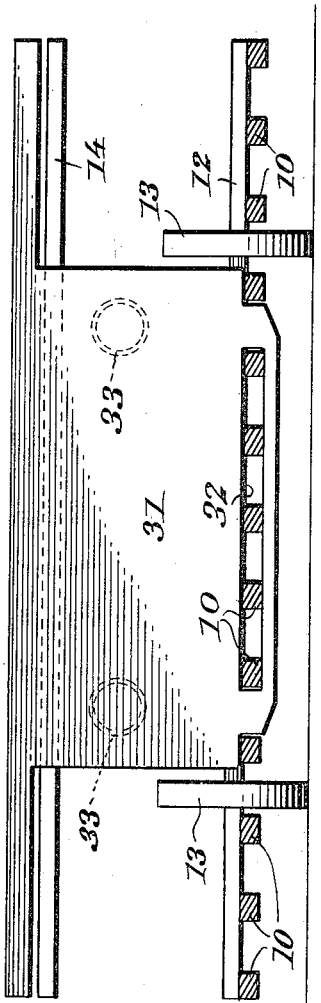
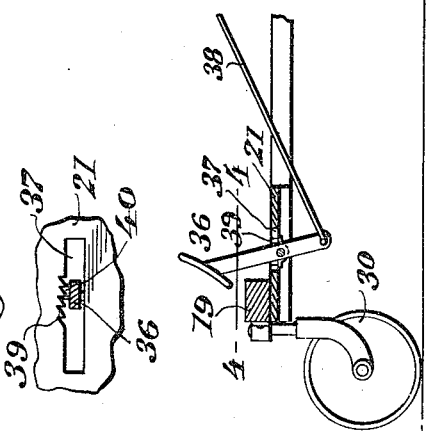
INVENTOR
Charles G. Seger
WITNESSES
BY
ATTORNEY

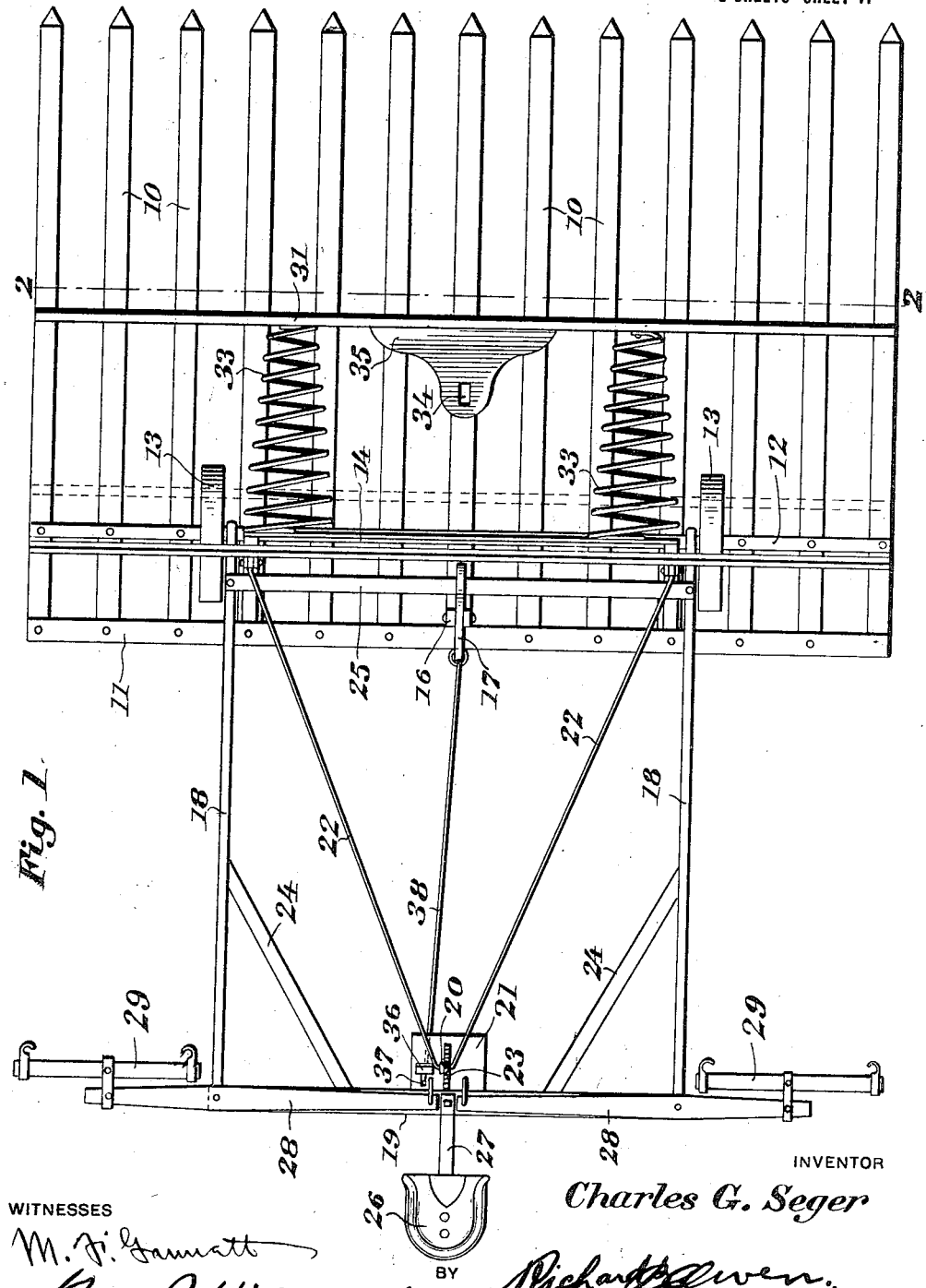

UNITED STATES PATENT OFFICE.

CHARLES G. SEGER, OF LYONVILLE, SOUTH DAKOTA.

HAY-SWEEP CLEANER.

1,219,495.	Specification of Letters Patent.	Patented Mar. 20, 1917.

Application filed December 29, 1915. Serial No. 69,211.

*To all whom it may concern:*

Be it known that I, CHARLES G. SEGER, a citizen of the United States, residing at Lyonville, in the county of Brule and State of South Dakota, have invented certain new and useful Improvements in Hay-Sweep Cleaners, of which the following is a specification.

This invention relates to an improved attachment for a hay sweep and the principal object of the invention is to provide an attachment which may be mounted upon the hay sweep and will serve to assist in the removal of hay from the teeth of the sweep.

Another object of the invention is to so mount the attachment that it may be releasably held in an inoperative position and to further so mount the attachment that when released it may move toward the free ends of the teeth and thus serve to push the hay off of the teeth.

Another object of the invention is to so construct the attachment that it may be connected with hay sweeps now in use thus making it unnecessary to provide a special type of hay sweep to carry the attachment.

This invention is illustrated in the accompanying drawings, wherein:—

Figure 1 is a top plan view of a hay sweep provided with the improved attachment.

Fig. 2 is a view taken along the line 2—2 of Fig. 1.

Fig. 3 is a longitudinal sectional view through the hay sweep and attachment with the attachment shown in the inoperative position.

Fig. 4 is a fragmentary sectional view taken along the line 4—4 of Fig. 3.

In this device there is provided a sweep having the teeth or tines 10 connected at their rear ends with the cross bar 11 and also connected with the axle 12 which carries the supporting wheel 13. A frame 14 is carried by certain of the teeth 10 and is provided with an opening 15, the purpose of which will be hereinafter brought out. A bracket or standard 16 is provided at the transverse center of the rear end portion of the sweep to pivotally mount the latch 17 as shown in Fig. 3.

The carriage is connected with the fork by means of the side bars 18 which lead from the cross bar 19. These side bars 18 are pivotally connected with the axle 12 and therefore the angle of the teeth 10 can be regulated through the medium of the latch lever 20 carried by platform 21 and provided with rods 22 connected with frame 14, as shown in Fig. 1. By adjusting the latch lever the fork may be rocked through the medium of the rods 22 and when the latch lever is released the fork will be held at an adjusted angle through engagement of the latch lever with its rack 23. Bracing bars 24 and 25 are provided for the cross bar 19 and side bars 18 thus providing a strong and durable carriage. The seat 26 has its supporting arm 27 connected with cross bar 19 between the inner ends of the draft equalizers 28 which are pivotally connected with the outer ends of the cross bar 19 and carry the swingle-trees 29. Therefore the horses will be positioned behind the rack and will not walk upon the hay which is to be scooped up by the rack. A caster 30 may be provided adjacent each end of the cross bar 19 for supporting the rear end portion of this sweep.

The attachment which forms the subject matter of this invention will now be described. The hay removing element or plate 31 is provided with an opening 32 through which certain of the teeth or tines 10 extend thus slidably mounting the plate upon the teeth of the fork. Springs 33 are positioned between the frame 14 and hay removing plate 31 and it will thus be seen that the hay removing plate will be normally held in the position shown in Fig. 1 but yieldably held in this normal position so that it may be moved to the position shown in Fig. 3 and releasably held in this position by means of the latch 17 which fits into the opening 34 of the tongue 35. This tongue 35 extends through opening 15 when the plate is moved to the inoperative position and by engaging the hooked end of the latch 17 will raise the latch to a position in which it may drop into the opening 34. If desired a spring may be provided for normally holding the latch in the position shown in Fig. 3 thus making it easy to connect the latch with the tongue 35. A foot treadle or lever 36 is pivotally mounted in a slot 37 formed in the platform 21 and carries a line 38 which is connected with the latch 17. By moving the lever from the position shown in Fig. 3, the latch may be moved to release the tongue 35 and thus permit the springs to force the plate 31 toward the free ends of the teeth 10. Rack teeth 39 are provided for engagement by the tooth 40 of the lever 36 thus preventing danger of the lever 36 accidentally moving to a position to release the latch. Sufficient transverse play is permitted so that the lever may be moved to a releasing position when necessary.

When this hay sweep is used the draft animals are connected with the swingletrees 29 and the machine is then moved across the field. The cleaning mechanism will be in the position shown in Fig. 3 and thus the teeth of the fork will be unobstructed and the hay can be gathered. When the machine has taken up as much hay as it can carry, it is desired to remove the hay from the fork. The lever or treadle wil then be pressed thus moving the latch to a releasing position. The weight of the hay will prevent the plate 31 from moving toward the free ends of the teeth but as the machine is backed and the teeth can slip through the hay the spring will force the plate toward the free ends of the teeth thus moving the hay off of the teeth and making it unnecessary to back the machine any great extent before the hay is all removed from the fork. The plate can then be returned to the inoperative position and held by means of the latch.

I have therefore provided a hay sweep attachment which is so constructed that the hay may be easily removed from the fork after a load has been gathered. I have also provided a hay sweep attachment which is so constructed that it may be easily operated, it taking a small amount of effort to release the plate 31 or to return it to the inoperative position. It should be further noted that this device is so constructed that it may be easily connected with machines now in use, already for use, it being simply necessary to provide the plate 31, spring 33, latch 17 and actuating means for the latch.

What is claimed is:—

1. A hay sweep including a fork, a carriage, a hay removing plate slidably mounted upon said fork, resilient means engaging said plate and serving to move the plate toward the free end of the fork when expanding, a standard carried by said fork, a latch pivotally connected with said standard, a tongue extending from said plate and engaged by said latch when the plate is moved to compress said resilient means, an actuating lever pivotally connected with said carriage, and a line connecting said actuating lever with said latch whereby said latch may be moved to release said plate upon actuation of said lever.

2. A hay sweep including a fork having teeth and a frame positioned above said teeth, a carriage connected with said fork and provided with a platform, a hay removing plate slidably mounted upon the teeth of said fork, resilient means positioned between said plate and frame and serving to move said plate toward the free ends of said teeth, a latch pivotally connected with said fork, a tongue extending from said plate for engagement by said latch to releasably hold said plate in a set position with the resilient means compressed, an actuating lever carried by said platform, and means connecting said actuating lever with said latch whereby said latch may be moved to a releasing position by movement of said lever and permit the resilient means to expand and move said plate toward the free end of the fork teeth.

3. A hay sweep including a fork having teeth and a frame above said teeth, a latch pivotally mounted to the rear of said frame, a hay removing plate slidably mounted upon said teeth in front of said frame, a tongue extending from said plate and adapted for engagement by said latch to releasably hold said plate in a set position, resilient means positioned between said plate and frame, and compressed when said tongue is engaged by said latch and means for moving said latch to release said tongue whereby said resilient means may expand and move said plate toward the free ends of said teeth.

4. A hay sweep including a fork, a hay removing plate slidably mounted upon said fork, a tongue extending from said plate and provided with an opening, a latch having its free end extending to fit into the opening of said tongue and releasably hold said plate in a set position, means for moving said latch to release said plate, and resilient means for moving said plate toward the free ends of the teeth of said fork when said plate is released from said latch.

In testimony whereof I affix my signature in presence of two witnesses.

CHARLES G. SEGER.

Witnesses:
  VACLAV F. HOUDA,
  ALFRED SKINROOD.

Copies of this patent may be obtained for five cents each, by addressing the "Commissioner of Patents, Washington, D. C."